United States Patent
Lee et al.

(10) Patent No.: US 9,944,782 B2
(45) Date of Patent: Apr. 17, 2018

(54) COMPOSITION OF POLYPROPYLENE HAVING HIGH IMPACT STRENGTH AND HIGH ADHESION

(71) Applicants: Hyundai Motor Company, Seoul (KR); Kia Motors Corporation, Seoul (KR)

(72) Inventors: Han Ki Lee, Hwaseong-si (KR); Byung Wook Kang, Daejeon (KR); Seung Joon Lee, Daejeon (KR); Woong Jae Boo, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/358,393

(22) Filed: Nov. 22, 2016

(65) Prior Publication Data
US 2017/0342250 A1 Nov. 30, 2017

(30) Foreign Application Priority Data
May 26, 2016 (KR) .................. 10-2016-0065007

(51) Int. Cl.
*C08L 23/16* (2006.01)
*C09J 123/16* (2006.01)

(52) U.S. Cl.
CPC ............ *C08L 23/16* (2013.01); *C09J 123/16* (2013.01); *C08L 2205/025* (2013.01); *C08L 2205/035* (2013.01); *C08L 2207/04* (2013.01)

(58) Field of Classification Search
CPC ............. C08L 23/16; C08L 2205/025; C08L 2205/035; C08L 2207/04; C09J 123/16
See application file for complete search history.

(56) References Cited

U.S. PATENT DOCUMENTS

| 5,674,930 A | 10/1997 | Sugiura et al. |
| 2002/0077396 A1* | 6/2002 | Yu .............................. C08K 3/34 524/232 |

FOREIGN PATENT DOCUMENTS

| JP | 3313622 B2 | 5/2002 |
| JP | 2002-265716 A | 9/2002 |
| JP | 5828872 B2 | 10/2015 |
| KR | 10-0215332 B1 | 5/1999 |
| KR | 10-2003-0093829 A | 12/2003 |
| KR | 10-0855332 B1 | 8/2008 |
| KR | 10-2014-0060129 A | 5/2014 |
| KR | 10-2015-0072558 A | 6/2015 |
| KR | 10-2016-0057528 A | 5/2016 |

* cited by examiner

*Primary Examiner* — Robert Jones, Jr.
(74) *Attorney, Agent, or Firm* — Morgan, Lewis & Bockius LLP

(57) ABSTRACT

A composition of polypropylene composite resin having high impact strength and high adhesion is provided. The composition of polypropylene composite resin having high impact strength and high adhesion can largely enhance base adhesion and impact resistance due to a high friction coefficient while providing a similar mechanical property to the related art. The compositions provided herein include mixing a polypropylene polymer, a polyethylene resin composition, and a thermoplastic elastomer, a silane-based propylene polymer, and an inorganic filler as main components at a specific content ratio. The compositions have advantages including process simplification, cost reduction, and eco-friendly without a separate adhering process. Such compositions can be used for interior components such as sun visors, door trims, pillar trims of vehicles and various other industrial components and materials.

12 Claims, No Drawings

COMPOSITION OF POLYPROPYLENE HAVING HIGH IMPACT STRENGTH AND HIGH ADHESION

CROSS-REFERENCE TO RELATED APPLICATION

This application claims under 35 U.S.C § 119(a) the benefit of Korean Patent Application No. 10-2016-0065007, filed on May 26, 2016, the entire contents of which are incorporated herein by reference.

BACKGROUND

Technical Field

The present disclosure relates to a composition of polypropylene composite resin having high impact strength and high adhesion. More particularly, it relates to a composition of polypropylene composite resin having high impact strength and high adhesion, which can largely enhance base adhesion and impact resistance due to a high friction coefficient while having a similar mechanical property to the related art by mixing a polypropylene polymer, a polyethylene resin composition, and a thermoplastic elastomer, a silane-based propylene polymer, and an inorganic filler as main components at a specific content ratio, have advantages of process simplification, cost reduction, and eco-friendly without a separate adhering process, and can be used for interior components such as sun visors, door trims, pillar trims of vehicles and various industrial components and materials by using the same.

Background Art

As reducing vehicle weight and industrial costs is important, the adoption of plastic components as interior and exterior materials of the vehicles has been gradually increased. Among the materials, the use of polypropylene composite resins having the lowest specific gravity and the largest effect of reduction in weight of the vehicle is gradually increased.

Polypropylene composite resins have an advantage of reduction in weight and cost competitiveness, but when the polypropylene composite resin is used as the interior material, in order to ensure tactile sensation of the surface, advanced designs, and stability to ultraviolet rays, generally, an operation of covering the surface with foam/skin and other covering materials and the like is performed.

However, the surface friction coefficient of the polypropylene composite resin is low and thus adhesion with the foam/skin and other covering materials is difficult. Over time, many quality defects are caused by release from the polypropylene composite resin and the covering materials and wrinkles due to the deterioration of adhesion.

In order to overcome these problems, an additional adhesion process is required, but there are problems in that costs of raw materials are increased due to a separate additional process and harmful materials in the vehicle are increased. As a result, there is a limit that the problems are against eco-friendly and high-quality strategies in the global vehicle industry.

Accordingly, in order to achieve the functions as the vehicle components, research and development of a new polypropylene material having excellent base adhesion due to a high friction coefficient while satisfying mechanical properties which are similar to or greater than those of the existing polypropylene material are required.

The above information disclosed in this Background section is only for enhancement of understanding of the background of the invention and therefore it may include information that does not form the prior art that is already known in this country to a person of ordinary skill in the art.

SUMMARY OF THE DISCLOSURE

The present invention has been made in an effort to solve the above-described problems associated with prior art.

The inventors have discovered that the present invention generally enhance impact resistance and base adhesion of plastic components by providing a polypropylene resin with a high friction coefficient, having a similar mechanical properties to knon polypropylene resins. The improvements of the present invention are achieved by mixing a polypropylene polymer fraction including a high-crystalline ethylene-propylene copolymer, a polyethylene resin fraction including a low-specific gravity polyethylene and an ethylene vinyl acetate copolymer, a thermoplastic elastomer, a silane-based propylene polymer, and an inorganic filler, providing a resin of the present invention.

Therefore, an exemplary object of the present invention is to provide a composition of polypropylene composite resin with generally improved impact resistance and adhesion as well as excellent mechanical properties.

Another exemplary object of the present invention is to provide a molded article formed from a composition of polypropylene composite resin of the present invention.

In an exemplary embodiment, the present invention provides a composition of polypropylene composite resin comprising: (a) from about 43 wt % to about 52 wt % of a polypropylene fraction consisting of a mixture of (a-1) from about 10 wt % to about 20 wt % of an ethylene-propylene copolymer having an ethylene content of from about 40 wt % to about 60 wt % and (a-2) from about 80 wt % to about 90 wt % of a high-crystalline ethylene-propylene copolymer having crystallinity of more than about 45 wt %, as the polypropylene polymer;

(b) from about 8 wt % to about 10 wt % of a polyethylene resin fraction in having a mixture of (b-1) from about 60 wt % to about 80 wt % of a low-specific gravity polyethylene polymer having a specific gravity of about 0.905 to about 0.915 and (b-2) from about 20 wt % to about 40 wt % of an ethylene vinyl acetate copolymer having a vinyl acetate content of from about 20 wt % to about 40 wt %, as the polyethylene resin composition;

(c) from about 15 wt % to about 25 wt % of a thermoplastic elastomer polymerized in a block copolymer form;

(d) from about 2 wt % to about 3 wt % of a silane-based polypropylene polymer grafted with a silane-based functional group of about 3 wt % to about 10 wt %; and (e) from about 15 wt % to about 25 wt % of an inorganic filler having a plated structure.

In another aspect, the present invention provides a molded article prepared by the composition of polypropylene composite resin.

According to the exemplary embodiments of the present invention, the polypropylene composite resin of the invention can generally improve adhesion with foam/skin and other covering materials due to the high friction coefficient of the material, while providing excellent mechanical properties as compared with existing polypropylene material. Particularly, with regard to the mechanical properties, impact resistance is excellent and thus an functional property of the component is achieved.

Even without a separate adhesion process, release between the base and coating does not readily occur, and thus defects are reduced and excellent quality is simultaneously ensured. The present invention has advantages of process simplification, cost reduction, and eco-friendliness.

The present invention can be widely applied to interior components such as sun visors, door trims, pillar trims of vehicles and components and materials in various industries using the polypropylene composite resin.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Further, in the following description, a detailed explanation of known related technologies may be omitted to avoid unnecessarily obscuring the subject matter of the present invention.

Hereinafter, the present invention will be described in more detail as an Example.

The present invention provides a composition of polypropylene composite resin comprising: (a) from about 43 wt % to about 52 wt % of a polypropylene polymer fraction comprising or consisting of a mixture of (a-1) from about 10 wt % to about 20 wt % of an ethylene-propylene copolymer having an ethylene content of about 40 wt % to about 60 wt % and (a-2) from about 80 wt % to about 90 wt % of a high-crystalline ethylene-propylene copolymer having crystallinity of more than about 45 wt %, as the polypropylene polymer;

(b) from about 8 wt % to about 10 wt % of a polyethylene resin fraction comprising or consisting of a mixture of (b-1) from about 60 wt % to about 80 wt % of a low-specific gravity polyethylene polymer having the specific gravity of about 0.905 to about 0.915 and (b-2) from about 20 wt % to about 40 wt % of an ethylene vinyl acetate copolymer having a vinyl acetate content of about 20 wt % to about 40 wt %, as the polyethylene resin composition;

(c) from about 15 wt % to about 25 wt % of a thermoplastic elastomer polymerized in a block copolymer form;

(d) from about 2 wt % to about 3 wt % of a silane-based polypropylene polymer grafted with a silane-based functional group of about 3 wt % to about 10 wt %; and (e) from about 15 wt % to about 25 wt % of an inorganic filler having a plated structure.

The composition of polypropylene composite resin of the present invention includes the propylene polymer fraction, the polyethylene resin fraction, the thermoplastic elastomer in a block copolymer form, the silane-based propylene polymer, and the inorganic filler as main technical components unlike an existing polypropylene composite resin, and each component is mixed with a specific content ratio, and thus the composition of polypropylene composite resin may have excellent base adhesion due to a friction coefficient of about 0.8 or more while having a mechanical property of high impact strength.

Polypropylene Polymer

According to an exemplary embodiment of the present invention, the composition of polypropylene composite resin may use from about 43 wt % to about 52 wt % (e.g., about 42 wt %, 43, 44, 45, 46, 47, 48, 49, 50, 51 or about 52 wt %) of the polypropylene polymer with respect to the entire composition of polypropylene composite resin as a basic resin.

In detail, when the content of the polypropylene polymer is less than about 43 wt %, rigidity deteriorates, and when the content of the polypropylene polymer is greater than about 52 wt %, the friction coefficient deteriorates and simultaneously, izod (i.e., izond impact testing) and surface impact strength decrease. The polypropylene polymer plays a key role in adjusting the balance of the properties of the composition of the present. Further, to achieve an increase in the rigidity, when the content of the polypropylene polymer (a) is greater than the disclosed range, the entire friction coefficient decreases due to a physical property of polypropylene and thus there is a problem in that base adhesion decreases.

The polypropylene polymer (a) includes a mixture of (a-1) from about 10 wt % to about 20 wt % of an ethylene-propylene copolymer having an ethylene content of from about 40 wt % to about 60 wt % and (a-2) from about 80 wt % to about 90 wt % of a high-crystalline ethylene-propylene copolymer having crystallinity of greater than about 45 wt %.

The ethylene-propylene copolymer (a-1) has good compatibility with the polyethylene polymer due to the high ethylene content and it plays an important role in increasing the friction coefficient. The high-crystallinity of the ethylene-propylene copolymer (a-2) increases the rigidity of a molded article. When the content of the ethylene-propylene copolymer is less than about 10 wt %, the friction coefficient decreases and when the content is greater than about 20 wt %, the mechanical rigidity decreases. As a result, the balance between the mechanical property and the surface friction coefficient may be maintained by selection of an appropriate mixing ratio of the ethylene-propylene copolymer (a-1) and the high-crystalline ethylene-propylene copolymer (a-2).

Ethylene-Propylene Copolymer (a-1)

According to an exemplary embodiment of the present invention, the ethylene-propylene copolymer (a-1) has good compatibility with the polyethylene polymer due to the high ethylene content and it plays an important role in increasing the friction coefficient.

The ethylene-propylene copolymer (a-1) may include an ethylene content of from about 40 wt % to about 60 wt %. When the ethylene content is less than about 40 wt %, the friction coefficient is increased and the impact strength decrease due to the reduction of the compatibility with the polyethylene polymer, and when the ethylene content is greater than about 60 wt %, the rigidity of the mechanical properties of the plastic decreases and there is a problem in that the rigidity of the molded article decreases.

An exemplary ethylene-propylene copolymer (a-1) has a melt index of from about 5 to about 20 g/10 min (@230° C., 2.16 kg). In this case, when the melt index is less than about 5 g/min (@2 30° C., 2.16 kg), the moldability deteriorates due to decrease in flowability, and when the melt index is greater than about 20 g/min (@230° C., 2.16 kg), the izod and surface impact strength deteriorate. Preferably, the melt index is from about 5 to 17 g/min (@230° C., 2.16 kg) (e.g., about 5 g/min, 6, 7, 8, 9, 10, 11, 12, 13, 14, 15, 16 or about 17 g/min).

High-Crystalline Ethylene-Propylene Copolymer (a-2)

According to an exemplary embodiment of the present invention, the high-crystalline ethylene-propylene copolymer (a-2) has the high crystallinity of greater than about 45 wt % to have an effect on increasing the rigidity of the molded article. In this case, when the crystallinity is less than about 45 wt %, the decreases. Preferably, the crystallinity is from about 55 to 100 wt % (e.g., about 55, 57, 59, 60, 63, 65, 67, 70, 71, 73, 75, 77, 79, 80, 81, 83, 85, 87, 89, 90, 91, 93, 95, 97, 99, or 100 wt %).

An exemplary high-crystallinity ethylene-propylene copolymer (a-2) has a melt index of from about 10 to about 30 g/10 min (A 230° C., 2.16 kg). In this case, when the melt index is less than about 10 g/min (@230° C., 2.16 kg), the moldability decreases due to a reduction in flowability, and when the melt index is greater than about 30 g/min (@230° C., 2.16 kg), the izod and surface impact strength decrease. The melt index is preferably from about 10 to about 20 g/min (@230° C., 2.16 kg), and more preferably from about 8 to about 17 g/min (@230° C., 2.16 kg) (e.g., about 8 g/min, 9, 10, 11, 12, 13, 14, 15, 16 or about 17 g/min).

Polyethylene Resin Composition (b)

According to an exemplary embodiment of the present invention, the polyethylene resin fraction (b) is from about 8 wt % to about 10 wt % (e.g., about 8, 9, or about 10 wt %) with respect to the entire composition of polypropylene composite resin. In this case, when the content is less than about 8 wt %, the friction coefficient decreases and when the content is greater than about 10 wt %, the rigidity decreases.

An exemplary polyethylene resin composition (b) of the present invention includes a mixture of (b-1) from about 60 wt % to about 80 wt % of a low-specific gravity polyethylene polymer having the specific gravity of about 0.905 to about 0.915 and (b-2) from about 20 wt % to about 40 wt % (e.g., about 20, 25, 30, 35, or about 40 wt %) of an ethylene vinyl acetate copolymer having a vinyl acetate content of from about 20 wt % to 40 wt % (e.g, about 20, 24, 30, 35 or about 40 wt %).

When the content of the low-specific gravity polyethylene polymer (b-1) is less than about 60 wt %, a relatively large amount of ethylene vinyl acetate copolymer is mixed, and thus the compatibility of the polyethylene resin composition with the polypropylene polymer decreases. As a result, the mechanical property may also decrease. Further, when the content is greater than about 80 wt %, a relatively small amount of ethylene vinyl acetate copolymer is mixed and thus the friction coefficient decreases and as a result, the base adhesion decreases.

(b-1) Low-Specific Gravity Polyethylene Polymer (b-1)

According to an exemplary embodiment of the present invention, the low-specific gravity polyethylene polymer (b-1) has a melt index from about 10 g/10 min to about 30 g/10 min (@230° C., 2.16 kg) and the content of a long chain branch which is a side chain per 1000 carbons (C) as a main chain may be about 4 to 7 wt %. Herein, the content (wt %) of long chain branch per 1000 carbons generally represents the ethylene content in the polypropylene copolymer.

The low-specific gravity polyethylene polymer (b-1) may have a specific gravity of from about 0.905 to about 0.915. When the specific gravity is less than about 0.905, the rigidity of the polyethylene resin composition is low and thus the rigidity of the entire composition decreases. Yet, when the specific gravity is greater than about 0.915, the base adhesion decreases due to the reduction of the friction efficient.

The low-specific gravity polyethylene polymer (b-1) may have a melt index of about 10 g/10 min to about 30 g/10 min (@230° C., 2.16 kg). When the melt index is less than about 10 g/10 min (@230° C., 2.16 kg), the moldability is poor due to a reduction in flowability, and when the melt index is greater than about 30 g/10 min (@2 30° C., 2.16 kg), the izod and surface impact strength decrease.

An exemplary low-specific gravity polyethylene polymer (b-1) includes form about 4 wt % to about 7 wt % of the long chain branch per 1000 carbons (C). When the content of the long chain branch per 1000 carbons is less than about 4 wt %, the specific gravity of the polyethylene resin composition is increased and thus the friction coefficient may deteriorate. Further, when the content is greater than about 7 wt %, the compatibility with the polypropylene deteriorates and thus the entire mechanical properties including the rigidity and the impact strength of the composition of polypropylene composite resin decrease.

Ethylene Vinyl Acetate Copolymer (b-2)

According to an exemplary embodiment of the present invention, the ethylene vinyl acetate copolymer (b-2) may include a vinyl acetate content of from about 20 wt % to about 40 wt % (e.g., about 20, 21, 22, 23, 24, 25, 26, 27, 28, 29, 30, 31, 32, 33, 34, 35, 36, 37, 38, 39 or about 40 wt %). In this case, when the vinyl acetate content is less than about 20 wt %, the surface friction coefficient deteriorates due to reduction of polar groups, and when the vinyl acetate content is greater than about 40 wt %, a large amount of polar groups is mixed and thus water intake is increased and the moldability deteriorates. In the present invention, the low-specific gravity polyethylene polymer and the ethylene vinyl acetate copolymer play a key role in increasing the base adhesion due to high friction coefficient and thus, it is advantageous to satisfy the content ratio.

An exemplary ethylene vinyl acetate copolymer (b-2) has a melt index of from about 10 to about 30 g/10 min (e.g., about 10, 11, 12, 13, 14, 15, 16, 17, 18, 19, 20, 21, 22, 23, 24, 25, 26, 27, 28, 29, or about 30 g/10 min) (@230° C., 2.16 kg). When the melt index is less than about 10 g/10 min (@230° C., 2.16 kg), the moldability is poor due to decrease in flowability, and when the melt index is greater than about 30 g/10 min (@230° C., 2.16 kg), the izod and surface impact strength decrease.

Thermoplastic Elastomer (c)

According to an exemplary embodiment of the present invention, the thermoplastic elastomer (c) may have a specific gravity of about 0.86 to about 0.92 (e.g., about 0.86, 0.87, 0.88, 0.89, 0.90, 0.91, or about 0.92) and a melting point (Tm) of about 120° C. to about 200° C. The thermoplastic elastomer can be polymerized in a block copolymer form.

Unlike a polymerized rubber which is a random copolymer, the thermoplastic elastomer (c) of the present invention may be a thermoplastic elastomer in which ethylene-butylenes, ethylene-octenes, or mixtures thereof are polymerized at a regular interval or in sequence in a block copolymer form. Preferably, the thermoplastic elastomer (c) uses a thermoplastic elastomer in which the ethylene-octenes are polymerized in a block copolymer form. The octene content of the ethylene-octene may be from about 20 wt % to about 30 wt % (e.g., about 20, 21, 22, 23, 24, 25, 26, 27, 28, 29 or about 30 wt %). When polymerized in the block copolymer form, the specific gravity is relatively low, e.g, from about 0.86 to about 0.92 and the melting point Tm has high-heat resistance of from about 120° C. to about 200° C.

More particularly, unlike general thermoplastic elastomers, in the case of a block copolymer, rigid and flexible regions in the polymer chain are alternately and regularly arranged. This feature of the polymers of the invention plays an important role in increasing the friction coefficient.

When the thermoplastic elastomer is not in the block copolymer form, the friction coefficient deteriorates. In exemplary embodiments, the content of the thermoplastic elastomer (c) is from about 15 wt % to about 25 wt %, and particularly from about 18 wt % to about 22 wt % (e.g., about 18, 19, 20, 21 or about 22 wt %), and when the content thereof is less than about 15 wt %, the izod and surface impact strength deteriorate and the friction coefficient deteriorates, and thus the base adhesion is lowered, and when the content thereof is greater than about 25 wt %, the rigidity decreases.

Silane-Based Propylene Polymer (d)

According to an exemplary embodiment of the present invention, the silane-based propylene polymer (d) may include a grafted silane-based functional group in an amount of from about 3 wt % to about 10 wt % (e.g., about 3, 4, 5, 6, 7, 8, 9 or about 10 wt %). In some cases, when the silane-based functional group is grafted with less than about 3 wt %, compatibility of the polypropylene polymer (a) and the polyethylene resin composition (b) is lowered and the entire mechanical properties deteriorate. On the contrary, when the silane-based functional group is grafted with greater than about 10 wt %, the water content is increased and the brittleness is generated. In the composition described herein, the silane-based functional group may use one or more kinds selected from the group consisting of aminoethyl aminopropyl silane, chloropropyl triethoxy silane, methyldiamine ethoxy silane, phenyl trimethoxy silane, vinyl benzyl aminoethyl aminopropyl trimethoxy silane, aminoethyl aminopropyl trimethoxy silane, methacryloxy propyl trimethoxysilane, and 3-glycidoxy propyl trimethoxy silane. Preferably, a silane-based propylene polymer in which from about 3 wt % to about 10 wt % of aminoethyl aminopropyl silane is grafted may be used.

The silane-based propylene polymer (d) may be used at an amount from about 2 wt % to about 3 wt % with respect to the entire composition of polypropylene composite resin. In this case, when the use content is less than about 2 wt %, the compatibility deteriorates and thus the mechanical property deteriorates, and when the use content is greater than about 3 wt %, the rigidity deteriorates.

Inorganic Filler (e)

According to an exemplary embodiment of the present invention, the inorganic filler (e) is an inorganic filler having a plated structure and the lamellarity index of the filler may be about 5 to 15, e.g, 5, 6, 7, 8, 9, 10, 11, 12, 13, 14, or 15. Particularly, the lamellarity index is an index representing the flatness (large dimension/thickness) of the filler. The index has a large value as the cross-sectional area to the thickness of the inorganic filler is increased.

Generally, the lamellarity index of the inorganic filler is less than 3 and as the lamellarity index is increased, the property of reinforcing effect is very excellent. In the present invention, an inorganic filler having a lamellarity index of 5 to 15 may be used. When the lamellarity index is less than about 5, the property of reinforcing effect is low and thus the mechanical property deteriorates, and when the lamellarity index is greater than about 15, it is difficult to process the inorganic filler. In some embodiments of the composition of polypropylene composite resin, an inorganic filler having the high lamellarity Index is used. The inorganic filler can be positioned on the surface and observed by an electron microscope and the curvatures on the surface can be measured in micro units. Increases in curvature can increase the friction coefficient.

The inorganic filler (e) may include one or more kinds selected from the group consisting of platy talc, mica, and platy Mg.

The plated inorganic filler can be included in an amount from about 15 wt % to about 25 wt % (e.g., about 15, 16, 17, 18, 19, 20, 21, 22, 23, 24 to about 25 wt %) with respect to the entire composition of polypropylene composite resin, and in this case, when the content is less than about 15 wt %, the rigidity deteriorates and when the content is greater than about 25 wt %, the izod and surface impact deteriorate.

Other Additives (f)

According to an exemplary embodiment of the present invention, the composition of polypropylene composite resin may further include one or more kinds of additives selected from the group consisting of antioxidants, neutralizing agents, antistatic agents, UV stabilizers, and slip agents in order to improve the performance of the molded article and the characteristic in the process in addition to the main components. The additives may be adjusted and used in an appropriate range which maintains surface quality, reduces brittleness, and provides other favorable basic physical properties.

The present invention provides a molded article prepared by the composition of polypropylene composite resin described herein.

Accordingly, the composition of polypropylene composite resin according to the present invention may generally improves adhesion with foam/skin and other covering materials due to the high friction coefficient, while providing favorable mechanical properties as compared with existing polypropylene material. Impact resistance is excellent and thus improved functional aspects of the component are achieved.

Even without a separate adhesion process, a release between the coating and the base does not occur, and thus defects are reduced and simultaneously the excellent quality is ensured. The present invention has advantages of process simplification, cost reduction, and eco-friendliness in the industry.

The present invention can be widely applied to interior components such as sun visors, door trims, pillar trims of vehicles and components and materials in various industries using the polypropylene composite resin.

Hereinafter, the present invention will be described in more detail according to Examples, but is not limited thereto.

EXAMPLES

The following examples illustrate the invention and are not intended to limit the same.

Example 1

A polypropylene polymer consisting of a mixture of 15 wt % of an ethylene-propylene copolymer having the ethylene content of 50 wt % and 85 wt % of a high-crystalline ethylene-propylene copolymer having crystallinity of 55 wt % was prepared.

Next, a polyethylene resin composition consisting of a mixture of 70 wt % of a low-specific gravity polyethylene polymer having the specific gravity of 0.91 in which a long chain branch per 1000 carbons is 5 wt % and 30 wt % of an ethylene vinyl acetate copolymer having the vinyl acetate content of 30 wt % was prepared.

Thereafter, 48 wt % of the polypropylene polymer, 9 wt % of the polyethylene resin composition, 20 wt % of the thermoplastic elastomer polymerized into a block copolymer, 3 wt % of the silane-based propylene polymer grafted with 7 wt % of aminoethyl aminopropyl silane, 20 wt % of talc having a lamellarity index of 10, and 1 part per hundred resin (PHR) of additives were physically mixed and then processed in a pellet form through a biaxial extruder. In some instances, the thermoplastic elastomer used was a thermoplastic elastomer in which ethylene-octenes having the octene content of 20 to 30 wt % were polymerized into a block copolymer form. The pellet was injected under an injection condition of 220±30° C. to prepare a specimen for evaluating thermal/mechanical properties.

Example 2

The composition of polypropylene composite resin was prepared with the same content used in Example 1 and the polyethylene resin composition used a mixture of 70 wt % of a low-specific gravity polyethylene polymer having the specific gravity of 0.906 with 7 wt % of the long chain branch per 1000 carbons and 30 wt % of an ethylene vinyl acetate copolymer including 40 wt % of the vinyl acetate to be processed in a pellet form. The pellet was injected under an injection condition of 220±30° C. to prepare a specimen for evaluating thermal/mechanical properties.

Example 3

The composition of polypropylene composite resin was prepared with the same content used in Example 1 and the polyethylene resin composition used a mixture of 70 wt % of a low-specific gravity polyethylene polymer having the specific gravity of 0.913 with 4 wt % of the long chain branch per 1000 carbons and 30 wt % of an ethylene vinyl acetate copolymer including 20 wt % of the vinyl acetate to be processed in a pellet form. The pellet was injected under an injection condition of 220±30° C. to prepare a specimen for evaluating thermal/mechanical properties.

Comparative Example 1 and 2

The same components used in Example 1 were mixed and the composition of polypropylene composite resin was prepared at a mixed ratio outlined in the following Table 1 and then the same method as Example 1 was performed to prepare each specimen.

TABLE 1

| | Polypropylene polymer (a) | Polyethylene resin composition (b) | Thermoplastic elastomer (c) | Polypropylene polymer with grafted silane-based functional group (d) | Plated inorganic filler (e) |
|---|---|---|---|---|---|
| Comparative Example 1 | 52 | 5 | 20 | 3 | 20 |
| Comparative Example 2 | 44 | 13 | 20 | 3 | 20 |

Comparative Example 3

Except for using a general ethylene-octene thermoplastic elastomer instead of the thermoplastic elastomer polymerized into a block copolymer form, the composition of polypropylene composite resin was prepared with the same components and the same content ratios used in Example 1 to prepare a specimen for evaluating properties.

Comparative Example 4

Except for using talc having a lamellarity index of 2 as the inorganic filler having the plated structure, the composition of polypropylene composite resin was prepared with the same components and the same content ratios used in Example 1 to prepare a specimen for evaluating properties.

Comparative Example 5

Except for using a polyethylene resin composition consisting of a mixture of 70 wt % of a low-specific gravity polyethylene polymer having the specific gravity of 0.902 with 10 wt % of the long chain branch per 1000 carbons and 30 wt % of an ethylene vinyl acetate copolymer including 40 wt % of the vinyl acetate, the composition of polypropylene composite resin was prepared with the same components and the same content ratios used in Example 1 to prepare a specimen for evaluating properties.

Comparative Example 6

Except for using a polyethylene resin composition consisting of a mixture of 70 wt % of a low-specific gravity polyethylene polymer having the specific gravity of 0.917 with 20 wt % of the long chain branch per 1000 carbons and 30 wt % of an ethylene vinyl acetate copolymer including 10 wt % of the vinyl acetate, the composition of polypropylene composite resin was prepared with the same components and the same content ratios used in Example 1 to prepare a specimen for evaluating properties.

TEST EXAMPLES

Measurement of Properties of the Specimen

Results of properties illustrated in the following Table 2 represent average values except for an upper limit and a lower limit by measuring 10 specimens and test methods are as follows.

Specific gravity: Measured by taking a center of a specimen for measuring flexural strength according to an ASTM D792 method.

Measurement of Tensile strength and Elongation: Measured according to an ASTM D638 method and measured at a load application speed of 50 mm/min. The elongation was measured based on a fracture point.

Measurement of Flexural Modulus and Flexural Strength: Measured according to an ASTM D790 method and measured at a load application speed of 10 mm/min.

Measurement of Izod impact strength: Measured by a Notched specimen at room temperature (23° C.) and −10° C. according to an ASTM D256 method.

Measurement of Heat Distortion Temperature: Measured at a load of 0.46 MPa according to an ASTM D648 method.

Coefficient of Friction: A dynamic coefficient of friction was measured according to an ASTM D1894 method.

Evaluation of base adhesion: A PVC base for covering a sun visor of a vehicle was used as the covering base, and a base in the sun visor was formed from resins described in the Examples of the present invention and Comparative Examples to prepare an actual component. The base adhesion was evaluated using the corresponding actual component and "no error" in quality was represented by an "O", and a defect in quality was represented by an "X".

On the contrary, Comparative Example 1 is a case where a large amount of polypropylene polymer is used, and as a result, the rigidity is excellent as compared with Examples, but the impact strength decreases and the coefficient of friction is lowered and thus the base adhesion is lowered.

Comparative Example 2 is a case where a large amount of polyethylene resin composition is used, and as a result, the compatibility with the polypropylene polymer deteriorates and the entire mechanical properties are lowered, and thus a possibility to cause defects in a functional aspect of the component is high.

Comparative Example 3 is a case where a general ethylene-octene thermoplastic elastomer, not the thermoplastic elastomer polymerized in the block copolymer form, is used, and as a result, the entire properties are similar to those of Examples 1 to 3, but the coefficient of friction is low and thus the base adhesion deteriorates.

Comparative Example 4 is a case where a lamellarity index of the plated inorganic filler is low, and as a result, the entire mechanical properties are lower than those of

TABLE 2

| Classification | | Measured result | | | | | | | | |
|---|---|---|---|---|---|---|---|---|---|---|
| Item | Unit | Existing material | Example 1 | Example 2 | Example 3 | Comparative Example 1 | Comparative Example 2 | Comparative Example 3 | Comparative Example 4 | Comparative Example 5 | Comparative Example 6 |
| Specific gravity | g/cm$^3$ | 1.032 | 1.032 | 1.031 | 1.033 | 1.031 | 1.033 | 1.032 | 1.032 | 1.031 | 1.035 |
| Tensile strength | MPa | 25 | 26 | 28 | 26 | 32 | 19 | 26 | 25 | 24 | 28 |
| Elongation | % | 82 | 110 | 113 | 99 | 102 | 130 | 106 | 100 | 127 | 104 |
| Flexural strength | MPa | 41 | 42 | 45 | 41 | 49 | 37 | 42 | 40 | 37 | 45 |
| Flexural modulus | MPa | 2400 | 2460 | 2620 | 2400 | 2710 | 2100 | 2450 | 2400 | 2210 | 2450 |
| Izod impact strength (room temperature) | J/m | 180 | 199 | 191 | 207 | 120 | 165 | 189 | 178 | 159 | 184 |
| Izod impact strength (−10° C.) | J/m | 50 | 56 | 54 | 60 | 29 | 45 | 54 | 50 | 39 | 51 |
| Heat distortion temperature (0.46 MPa) | ° C. | 130 | 130 | 133 | 130 | 137 | 121 | 133 | 130 | 127 | 132 |
| Coefficient of friction | — | 0.31 | 0.91 | 1.02 | 0.88 | 0.27 | 1.06 | 0.29 | 0.67 | 1.03 | 0.43 |
| Base adhesion | — | X | O | O | O | X | O | X | X | O | X |

As listed in Table 2, it can be seen that the compositions of polypropylene composite resin prepared in Examples 1 to 3 have the coefficient of friction of 0.88 to 1.05 and, the coefficient of friction is largely improved as compared with an existing material.

Considering that a coefficient of friction of the commonly used polypropylene is 0.1 to 0.3 and a coefficient of friction of rubber is 1.1 to 1.3, the values of Examples 1 to 3 may be similar to that of the rubber, and as a result, it can be seen that adhesion between the urethane foam and the covering base is very excellent. Also, it can be seen that the compositions of Examples have high impact strength compared with the existing material and Comparative Examples 1 to 6 and have the similar rigidity.

Examples 1 to 3 and similar to the existing materials, and the coefficient of friction is low and thus the base adhesion deteriorates.

Comparative Example 5 is a case where the content of long chain branch per 1000 carbons of the low-specific gravity polyethylene polymer (b-1) is large and the specific gravity is low, and it can be seen that the compatibility with the polypropylene polymer deteriorates and thus the entire mechanical properties deteriorate.

Comparative Example 6 is a case where the content of long chain branch per 1000 carbons of the low-specific gravity polyethylene polymer (b-1) is low, the specific gravity is high, and the vinyl acetate content of the ethylene vinyl acetate copolymer (b-2) is low, and as a result, the mechanical properties are similar to those of the existing materials, but the coefficient of friction is low and thus the base adhesion deteriorates.

As a result, in the compositions of polypropylene composite resin prepared in Examples 1 to 3 according to the present invention, it can be seen that high impact resistance and the entire mechanical properties are balanced due to the optimal constituent components and the mixed ratios thereof as compared with Comparative Examples 1 to 6, and thus, the coefficient of friction is high and the base adhesion is improved.

The present invention has a similar rigidity to the related art, high impact resistance, and a high coefficient of friction and thus, adhesion with urethane foam and other covering bases is increased and adhesion between the bases is possible without a separate adhering process. As a result, process simplification, cost reduction, and quality improvement in actual industries are achieved, and thus, the present invention can be widely applied to interior components such as sun visors, door trims, pillar trims of vehicles and components and materials in various industries using the polypropylene resin.

The invention has been described in detail with reference to preferred embodiments thereof. However, it will be appreciated by those skilled in the art that changes may be made in these embodiments without departing from the principles and spirit of the invention. Therefore, the scope of which is defined in the appended claims and their equivalents.

What is claimed is:

1. A composition of polypropylene composite resin, the composition comprising:
    (a) from 43 wt % to 52 wt % of a polypropylene polymer comprising a mixture of (a-1) from 10 wt % to 20 wt % of an ethylene-propylene copolymer having an ethylene content of from 40 wt % to 60 wt % and (a-2) from 80 wt % to 90 wt % of a high-crystalline ethylene-propylene copolymer having crystallinity of more than 45 wt;
    (b) from 8 wt % to 10 wt % of a polyethylene resin composition comprising a mixture of (b-1) from 60 wt % to 80 wt % of a low-specific gravity polyethylene polymer having the specific gravity of from 0.905 to 0.915 and (b-2) from 20 to 40 wt % of an ethylene vinyl acetate copolymer having a vinyl acetate content of from 20 to 40 wt %,
    (c) from 15 wt % to 25 wt % of a thermoplastic elastomer polymerized into a block copolymer form;
    (d) from 2 wt % to 3 wt % of a silane-based propylene polymer graphited with a silane-based functional group of from 3 to 10 wt %; and
    (e) from 15 wt % to 25 wt % of an inorganic filler having a plated structure.

2. The composition of polypropylene composite resin of claim 1, wherein the ethylene-propylene copolymer (a-1) has a melt index of from 5 g/10 min to 20 g/10 min at 230° C. and 2.16 kg.

3. The composition of polypropylene composite resin of claim 1, wherein the high-crystallinity ethylene-propylene copolymer (a-2) has a melt index of from 10 g/10 min to 30 g/10 min at 230° C. and 2.16 kg.

4. The composition of polypropylene composite resin of claim 1, wherein the low-specific gravity polyethylene polymer (b-1) has a melt index of from 10 g/10 min to 30 g/10 min at 230° C. and 2.16 kg and comprises from 4 wt % to 7 wt % of a long chain branch per 1000 carbons (C).

5. The composition of polypropylene composite resin of claim 1, wherein the ethylene vinyl acetate copolymer (b-2) has a melt index of from 10 g/10 min to 30 g/10 min at 230° C. and 2.16 kg.

6. The composition of polypropylene composite resin of claim 1, wherein the thermoplastic elastomer (c) has a specific gravity of from 0.86 to 0.92 and a melting point (Tm) of from 120 to 200° C.

7. The composition of polypropylene composite resin of claim 1, wherein the thermoplastic elastomer (c) is a block copolymer form polymerized with ethylene-butylenes, ethylene-octenes, or mixtures thereof.

8. The composition of polypropylene composite resin of claim 7, wherein the ethylene-octenes contains from 20 wt % to 30 wt % of octane.

9. The composition of polypropylene composite resin of claim 1, wherein the silane-based functional group is one or more kinds selected from aminoethyl aminopropyl silane, chloropropyl triethoxy silane, methyldiamine ethoxy silane, phenyl trimethoxy silane, vinyl benzyl aminoethyl aminopropyl trimethoxy silane, aminoethyl aminopropyl trimethoxy silane, methacryloxy propyl trimethoxysilane, and 3-glycidoxy propyl trimethoxy silane.

10. The composition of polypropylene composite resin of claim 1, wherein the inorganic filler (e) has a lamellarity index of from 5 to 15.

11. The composition of polypropylene composite resin of claim 1, wherein the inorganic filler (e) is one or more selected from the group consisting of talc, mica, and platy Mg.

12. A molded article comprising the composition of polypropylene composite resin of claim 1.

* * * * *